United States Patent [19]
Richmond et al.

[11] Patent Number: 5,793,656
[45] Date of Patent: Aug. 11, 1998

[54] APPLICATION-SPECIFIC INTEGRATED CIRCUITS HAVING PROGRAMMING FUNCTIONS

[75] Inventors: Robert L. Richmond, Gaithersburg; Richard Clewer, Jamsville; Theodore C. Hockey, Mt. Airy, all of Md.

[73] Assignee: Hughes Electronics Corporation, El Segundo, Calif.

[21] Appl. No.: 268,938

[22] Filed: Jun. 30, 1994

[51] Int. Cl.$^6$ ............................... G06F 7/38; G05B 23/02
[52] U.S. Cl. ................... 364/716.01; 364/434; 364/459; 340/825.06; 340/825.15; 395/800
[58] Field of Search ........................ 364/716, 434, 364/459, 238, 736, 754; 395/325, 425, 775, 800; 307/38; 340/825.15, 825.06

[56] References Cited

U.S. PATENT DOCUMENTS

| | | | |
|---|---|---|---|
| 4,694,416 | 9/1987 | Wheeler et al. | 364/736 |
| 4,816,823 | 3/1989 | Polkinghorne et al. | 340/825.15 |
| 5,311,459 | 5/1994 | D'Luna et al. | 364/754 |
| 5,396,428 | 3/1995 | Tichborne et al. | 364/434 |
| 5,418,911 | 5/1995 | Zilka et al. | 395/325 |
| 5,418,976 | 5/1995 | Iida | 395/800 |

FOREIGN PATENT DOCUMENTS 0509376  10/1992  European Pat. Off. ......... G06F 15/31

OTHER PUBLICATIONS

Allen Brown, "Application Specific Digital Signal Processing", *Electronics World & Wireless World*, Jul. 1, 1993, pp. 581-583, Great Britian.

R. Crochiere and R. Rabiner, "Multirate Digital Signal Processing", 1983, pp. 42-56, 130-131, 193-199, 376-378.

Ronald D. Fellman "Design Issues and an Architecture for the Monolithic Implementation of a Parallel Digital Signal Processor", *IEEE Transactions on Acoustics, Speech, and Signal Processing*, May 1990, pp. 839-852, New York.

Brad Hamilton, "Programmable Architecture For Matrix And Signal Processing", IEEE Region 5 Conference Materials, Mar. 1988, pp. 116-120, Colorado.

*Primary Examiner*—Paul P. Gordon
*Assistant Examiner*—Emmanuel L. Moise
*Attorney, Agent, or Firm*—John T. Whelan; Michael Sales

[57] ABSTRACT

An application-specific integrated circuit (ASIC) for performing a selected one of a plurality of programmable functions on one or more input signals. The ASIC includes a plurality of component circuits (21-28), each for performing a predetermined component function ($F_1$-$F_8$) on a signal supplied thereto, a plurality of component routers (31-36) for selectively coupling together the plurality of component circuits (21-28), and a control processor interface (40) for receiving control signals that control the plurality of component routers (31-36) such that selected component circuits (21-28) are coupled together in a manner by which the predetermined component functions ($F_1$-$F_8$) of the selected component circuits are performed on the input signal in an order necessary to accomplish the selected one of the plurality of programmable functions. An application of the above-described circuit to a signal processing ASIC useful in stand-alone satellite modems is also disclosed.

18 Claims, 6 Drawing Sheets

APPLICATION-SPECIFIC INTEGRATED CIRCUITS HAVING PROGRAMMING FUNCTIONS

BACKGROUND OF THE INVENTION

1. Field of the Invention

The present invention relates to an application-specific integrated circuit (ASIC). More particularly, the present invention relates to an ASIC having a plurality of programmable functions.

2. Discussion of the Related Art

In general, integrated circuits may be grouped into two categories, those that are application-specific and those that are not.

Application-nonspecific integrated circuits (non-ASICs) are designed for general use, not for specific applications. Examples of non-ASICs include microprocessors, programmable logic arrays, logic gates, latches, multiplexers, etc. Although some non-ASICs may perform a number of functions, additional circuitry must be added such that a non-ASIC will be useful in a circuit designed for a specific application. Such additional circuitry adds to the size and number of connections required for implementation, and thus, significantly adds to the cost of manufacturing the circuit.

Integrated circuits designed for a specific application are typically designed to perform a single function and cannot perform diverse functions Examples of ASICs include finite impulse response filters, quadrature modulators and demodulators, numerically-controlled oscillators, etc.

In some electrical products, such as stand-alone satellite modems, it is desirable to have a number of functions available to choose from such that the product may operate in a number of different modes. In such a case, the electrical product would include a number of different ASICs, each for performing a different one of the available functions. However, due to size and packaging limitations, it is often impractical to include extra ASICs in an electrical product.

Furthermore, some ASICs that would be desirable to include in a given electrical product may include some of the same functional components. However, because the different ASICs are provided in separate integrated circuit packages, these identical functional components may not be eliminated without eliminating an entire ASIC and the function it performs.

SUMMARY OF THE INVENTION

Accordingly, the present invention has been made in view of the above circumstances and has as a feature to provide an ASIC that may perform one of a plurality of selectable functions on an input signal.

Additional features and advantages of the invention will be set forth in part in the description which follows and in part will be apparent from the description, or may be learned by practice of the invention. The objects and advantages of the invention may be realized and attained by means of the instrumentalities and combinations particularly pointed out in the written description and claims hereof as well as the appended drawings.

To achieve these and other advantages and in accordance with the invention, as embodied and broadly described herein, the application-specific integrated circuit for performing a selected one of a plurality of programmable functions on an input signal, comprises a plurality of component circuits, each for performing a predetermined component function on a signal supplied thereto, a plurality of component routers for selectively coupling together the plurality of component circuits, and a control processor interface for receiving control signals that control the plurality of component routers such that selected component circuits are coupled together in a manner by which the predetermined component functions of the selected component circuits are performed on the input signal in an order necessary to accomplish the selected one of the plurality of programmable functions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate one embodiment of the invention and, together with the description, serve to explain the objects, advantages, and principles of the invention. In the drawings.

DETAILED DESCRIPTION OF THE PREFERRED EMBODIMENTS

Reference will now be made in detail to the present preferred embodiment of the invention, examples of which are illustrated in the accompanying drawings.

Figure 1:
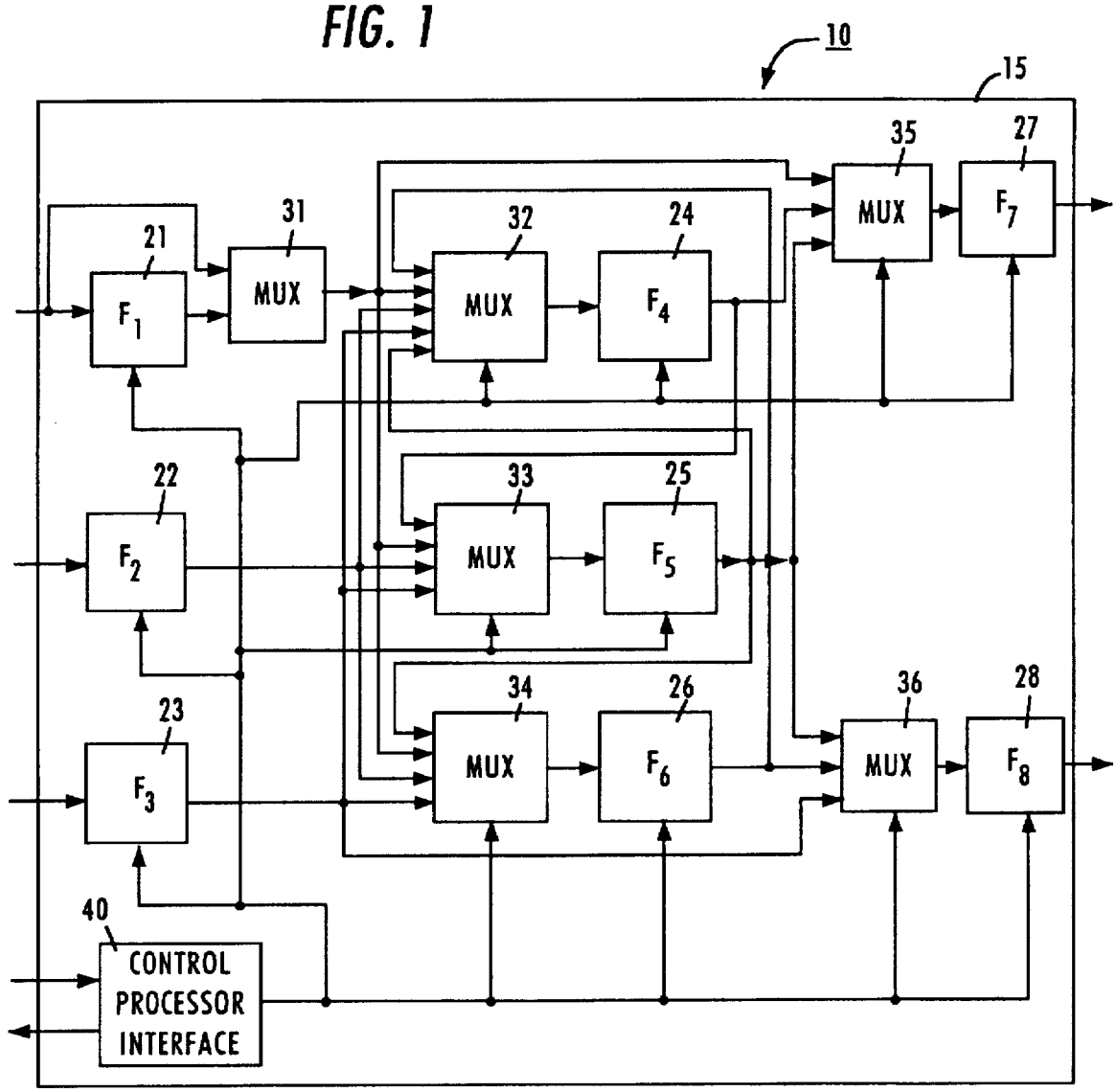
FIG. 1 is a schematic illustration of an ASIC constructed in accordance with the present invention.

The exemplary embodiment of an ASIC of the present invention is shown in FIG. 1 and is designated generally by the reference numeral 10.

ASIC 10 includes a substrate 15 having a plurality of component circuits 21–28, a plurality of component routers 31–36, and a control processor interface 40 formed thereon.

Each of component circuits 21–28 performs a predetermined component function $F_1$–$F_8$ on a signal supplied thereto.

Component routers 31–36 selectively couple together component circuits 21–28 to selectively route signals therethrough.

Control processor interface 40 receives control signals from an external source. These control signals control component routers 31–36 such that selected component circuits 21–28 are coupled together in a manner by which the predetermined component functions $F_1$–$F_8$ of selected component circuits 21–28 are performed on an input signal in an order necessary to accomplish a selected programmable function for ASIC 10.

The programmable functions that ASIC 10 is capable of performing depend upon the component functions $F_{1-8}$ made available by component circuits 21-28 and the sequential order in which a signal may be routed through component circuits 21-28. Hence, the particular arrangement and connections shown in FIG. 1 should be considered as but one generalized example of the application of the present invention.

ASIC 10 includes component circuits for performing eight different component functions. These component functions may be performed in virtually any order on a single data signal or in parallel on more than one data signal. Further, these functions may be bypassed by providing connections and a component router such as component router 31, or by providing certain coefficients to the component circuit such that the component circuit does not alter the input signal.

Some of the component circuits may perform identical functions, and thus, be useful in operating either in parallel or in a cascade configuration. Further, the output of a component circuit may be rerouted through the same component circuit.

Figure 2:
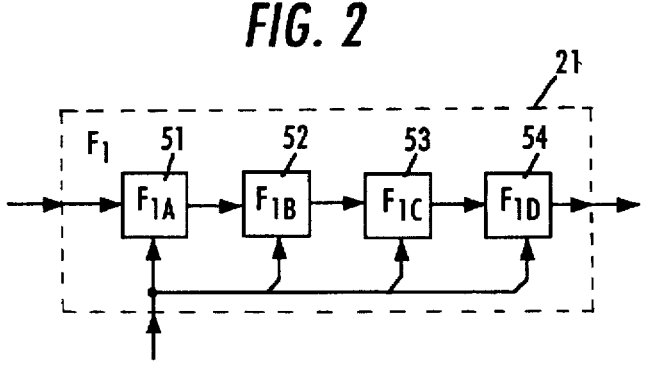
FIG. 2 is a schematic illustration of an exemplary component circuit consisting of a plurality of subcomponent circuits.

FIG. 2 shows an example of a component circuit 21 consisting of a plurality of serially connected subcomponent circuits 51-54 each of which performs a subcomponent function $F_{1A}$-$F_{1D}$. Each subcomponent circuit 51-54 may be connected to control processor interface 40 such that control processor interface 40 may control the operations performed by subcomponent circuits 51-52 or cause the subcomponent circuit to be bypassed.

Figure 3:
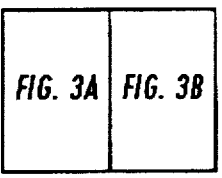
FIG. 3 is a schematic illustration showing an implementation of the present invention in a signal processing ASIC, which is particularly useful in stand-alone satellite modems.
Figure 3A:
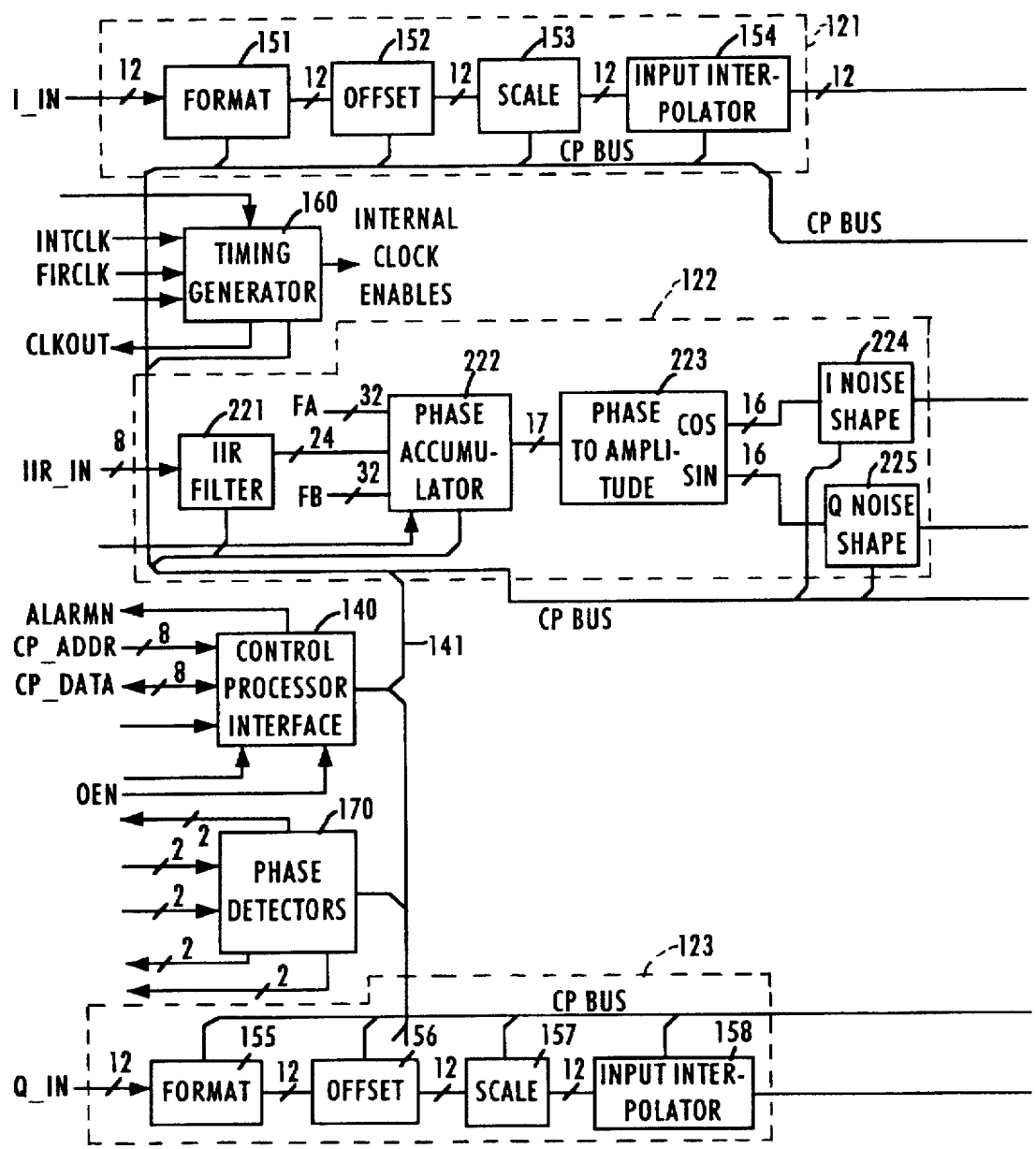
Figure 3B:
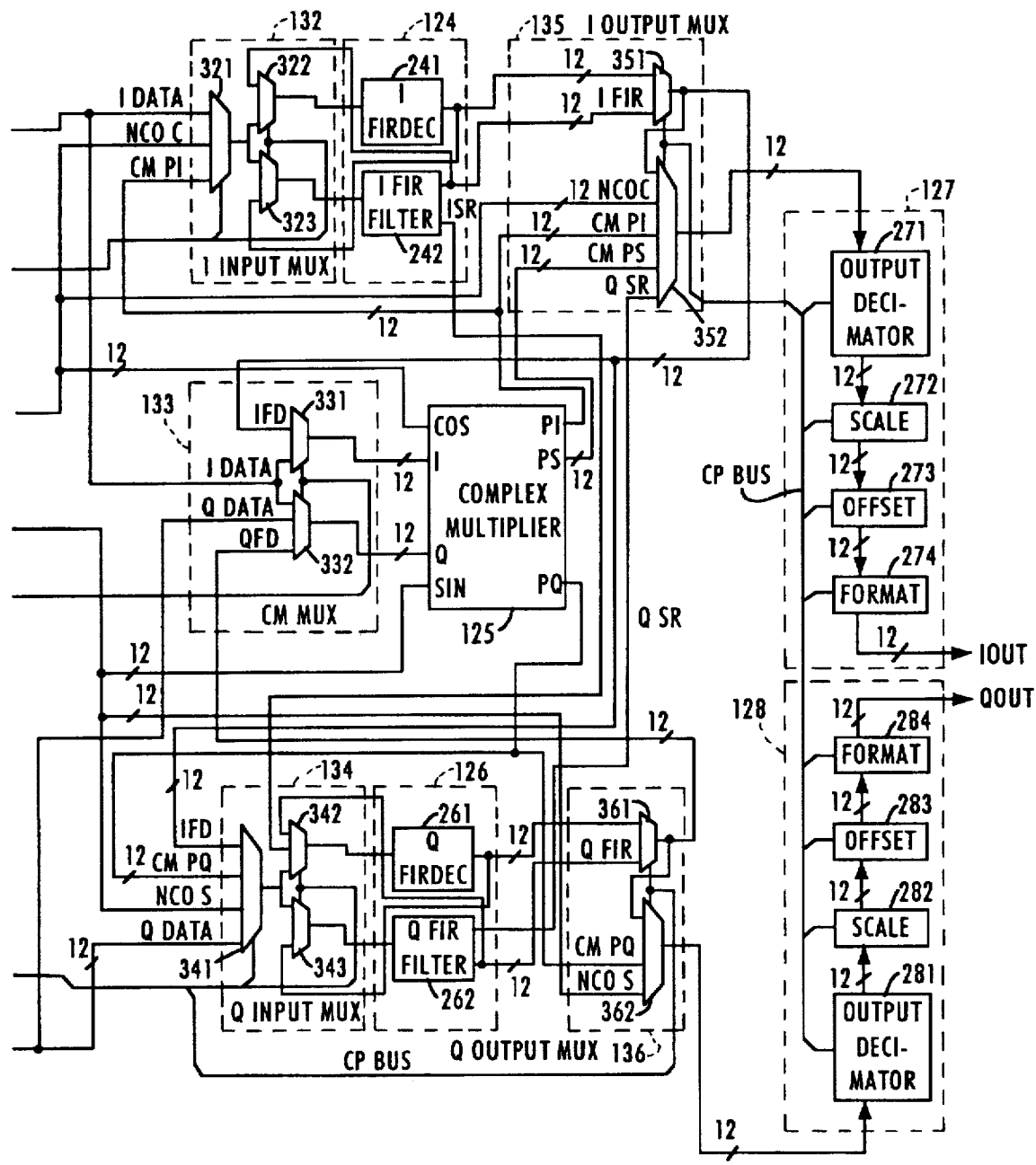

FIG. 3 shows an implementation of the present invention in a signal processing ASIC, which is particularly useful in stand-alone satellite modems.

The signal processing ASIC shown in FIG. 3 is formed on a substrate and includes a plurality of component circuits 121-128, a plurality of component routers 132-136, and a control processor interface 140 formed on the substrate. Additionally, the signal processing ASIC includes a timing generator 160 for generating internal clock enable signals for component circuits 121-128. The signal processing ASIC may optionally include phase detectors 170.

Each of component circuits 121-128 performs a predetermined component function on a signal supplied thereto. As shown in FIG. 3, component circuits 121 and 123 comprise input signal processing circuits for performing input signal processing on I and Q inputs, respectively. Component circuits 121 and 123 each include subcomponent circuits (151-154,155-158) comprising an input formatter (151,155), an input offsetter (152,156), an input scaler (153,157), and an input interpolator (154,155). Each of the subcomponents are connected to control processor interface 140 via a control processor (CP) bus 141.

Input formatters 151 and 155 receive data, which may be input in any of a number of possible formats, such as two's complement, offset binary, sign magnitude, two's complement negative, etc., and converts the input data into an internally used format. The data format is independently programmable for the various inputs to the signal processing ASIC. By selecting an internal format that is the same as the format of the input signal, input formatters 151 and 155 may be effectively bypassed.

Input offsetters 152 and 156 permit the data supplied from input formatters 151 and 155 to be summed with an independently programmable DC offset. The offset may be selected to null out DC offsets from A/D converters. By selecting a zero offset, input offsetters 152 and 156 may be effectively bypassed.

Input scalers 153 and 157 permit the data supplied from input offsetters 152 and 156 to be scaled by a right or left shift. The number of bits and the direction of shift may be independently programmed for each of input scalers 153 and 157. By selecting no shift, input scalers 152 and 156 may be effectively bypassed.

Input interpolators 154 and 158 increase the sample rates of the input signals when the output signal is required to have a greater sample rate than the input signal. Basically, input interpolators 154 and 158 insert the appropriate number of zero-valued samples between input samples. When the input signals are interpolated, the rate of the internal clock driving the component circuits following input interpolators 154 and 158 is appropriately increased. The rate of interpolation may be implied from the ratio of two input clocks FIRCLK and INTCLK supplied to timing generator 160.

Input interpolator 154 transmits an output signal designated as I DATA to component routers 132 and 133 for routing the I DATA output signal to either component circuit 124 or component circuit 125 for subsequent processing. Likewise, input interpolator 158 transmits an output signal designated as Q DATA to component routers 133 and 134 for routing the I DATA output signal to either component circuit 125 or component circuit 126 for subsequent processing. The output of input interpolators 154 and 158 can be multiplied by a fixed number to adjust gain. This fixed number may be programmed independently on the I and Q data paths such that the gain is adjustable.

Component circuit 124 comprises a finite input response (FIR) filter component including two subcomponents comprising a FIR input decimator/output interpolator 241 and a FIR filter 242. Similarly, component circuit 126 comprises a finite input response (FIR) filter component including two subcomponents comprising a FIR input decimator/output interpolator 261 and a FIR filter 262. As will be explained in more detail below, component circuits 124 and 126 may be utilized to process I and Q data signals in parallel, or to provide a cascade filter for a data signal supplied to the input of component circuit 124.

FIR filters 242 and 262 preferably operate by discrete time convolution of the input sequence with a stored sample impulse response. Exemplary FIR filters 242 and 262 receive control bits over CP bus 141 and select one of a number of predefined coefficients, which may be stored in a register, in response to the control bits. Additionally, FIR filters 242 and 262 preferably are capable of being internally cascaded to form a single filter of twice the length of either of FIR filters 242 and 262.

FIR input decimators/output interpolators 241 and 261 may be utilized as either of an input decimator filter or an output interpolator. Because input decimator filters and output interpolators typically have identical construction and are not used simultaneously, the same structure may be utilized to perform both functions. As input decimator filters, FIR input decimators/output interpolators 241 and 261 digitally bandlimit the input sequence to minimize the alias fold-over phenomenon. As output interpolators, FIR input decimators/output interpolators 241 and 261 increase the sample rate at the output of the signal processing ASIC and perform true linear interpolation on output signals from FIR filters 242 and 262.

Component circuit 124 provides an output signal to component router 135 and to component router 134 for routing back through component circuit 124 via component router 132, routing to component circuit 126, routing to component circuit 127, or for routing to circuit component 125 via routing component 133.

Component circuit 126 provides an output signal to component router 134 and to component router 136 for routing back through component circuit 126, routing to component circuit 127, routing to component 128, or for routing to circuit component 125 via routing component 133. The significance of the routing path selected will be explained in more detail below.

Figure 4:
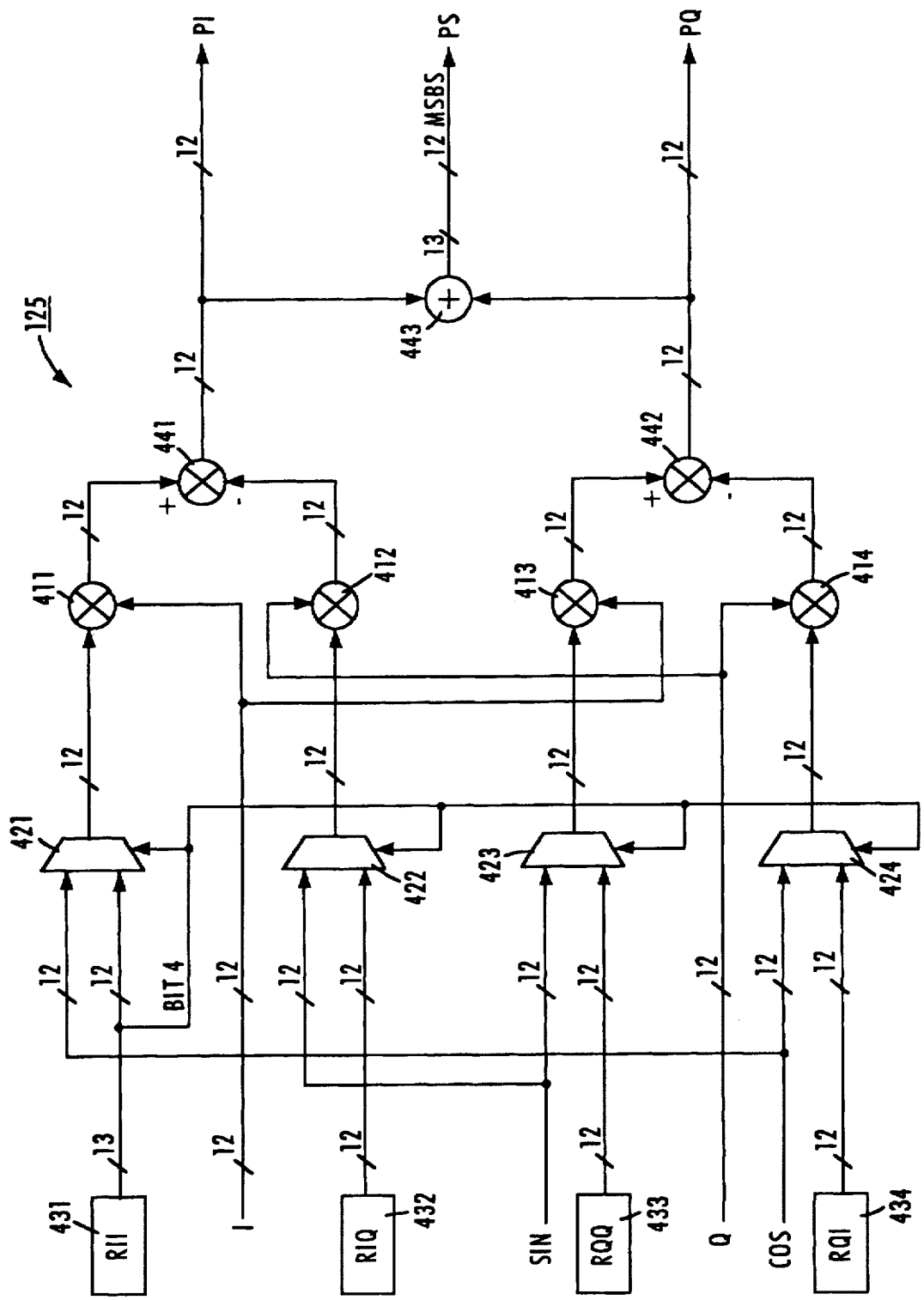
FIG. 4 is a schematic illustration of a complex multiplier useful in the implementation of the present invention in the signal processing ASIC shown in FIG. 3.

Component circuit 125 comprises a complex multiplier. The details of a complex multiplier 125 suitable for the signal processing ASIC is shown in FIG. 4. Complex multiplier 125 may receive inputs from numerous sources or combinations of sources. These sources include I and Q data lines, sine (SIN) and cosine (COS) data lines, and registers 431–434.

Complex multiplier 125 may multiply the I data received on the I data line with the real part of a complex sinusoid supplied from component circuit 122 and multiply the Q data with the imaginary part. Thus, the I and Q data are both multiplied by the SIN and COS outputs of component circuit 122, which comprises a numerically-controlled oscillator, using multipliers 411–414. The real portions of the multiplication product are added together by adder 441 to provide real output PI. Similarly, the imaginary portions are added together by adder 441 to provide real output PQ. Adder 443 adds the real and imaginary portions together and outputs the result designated as PS.

Complex multiplier 125 may also multiply the I and Q data by programmable constants stored in registers 431–434 to create a phase offset in a phase offset mode. When this phase offset mode is enabled, register 431 controls multiplexers 421–424 such that coefficients RII, RIQ, RQI, and RQQ stored in registers 431–434 are supplied to multipliers 411–414 in place of the SIN and COS data.

Referring back to FIG. 3, complex multiplier 125 transmits real output PI to component router 132 for routing to component circuit 124 and to component router 135 for routing to component circuit 127. Moreover, complex multiplier 125 transmits imaginary output PQ to component router 134 for routing to component circuit 126 and to component router 136 for routing to component circuit 128. The output sum of the real and imaginary portions PS is transmitted to component router 135 for routing to component circuit 127.

Component circuit 122 comprises a numerically-controlled oscillator (NCO) including subcomponents comprising an infinite impulse response (IIR) filter 221, a phase accumulator 222, a phase-to-amplitude convertor 223, an I signal noise shaper 224, and a Q signal noise shaper 225. In general, NCO 122 generates digital sinusoids by first accumulating the phase increment per clock cycle to form a phase ramp, and then converting the phase ramp to a corresponding quantized sinusoidal amplitude stored in a lookup table. Additionally, NCO 122 may perform post-processing on the quantized sinusoid to reduce quantization noise.

IIR filter 221 is preferably a first order digital filter utilizing programmable coefficients and an output scaler. IIR filter 221 is of particular utility in applications such as phase locked loops, carrier recovery, and bit timing recovery loops. The output (IIR data) of IIR filter 221 is transmitted to phase accumulator 222.

Figure 5:
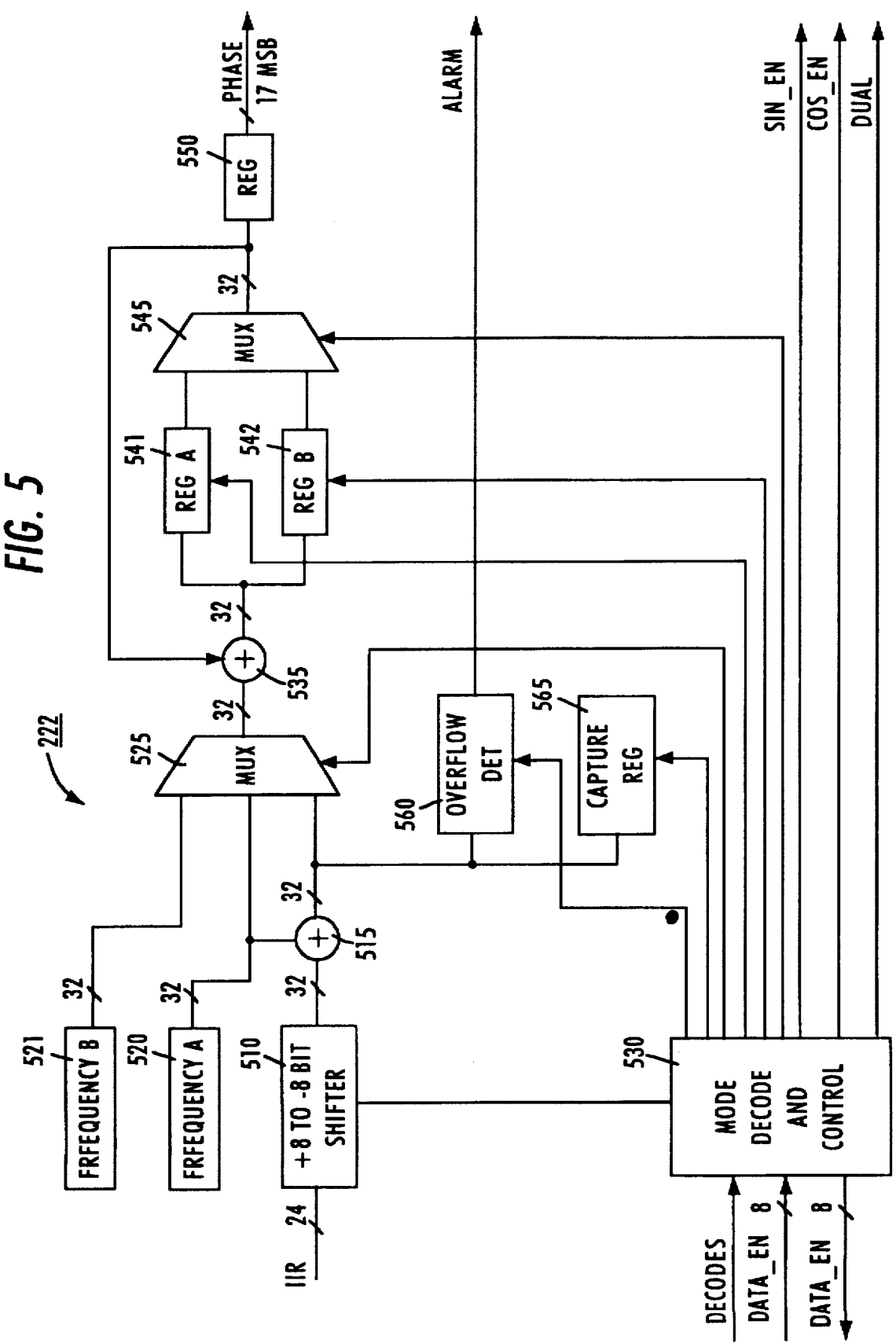
FIG. 5 is a schematic illustration of a phase accumulator useful in the implementation of the present invention in the signal processing ASIC shown in FIG. 3.

FIG. 5 shows the details of a phase accumulator 222 useful in the signal processing ASIC shown in FIG. 3. Phase accumulator 222 includes a bit shifter 510, an adder 515, a frequency A register 520, a frequency B register 521, a first multiplexer 525, a mode decoder and controller 530, an adder 535, a first register (A) 541, a second register (B) 542, a second multiplexer 545, an output register 550, an overflow detector 560, and a capture register 565.

Phase accumulator 222 may be programmed via mode decoder and controller 530 to operate in a number of modes. These modes include (1) accumulate frequency A register 520, (2) accumulate frequency B register 521, (3) accumulate sum of frequency A register 520 and the IIR data, (4) switch between frequency A and B depending upon a status of an indicator pin, (5) accumulate separately frequency A register 520 and frequency B register 521 on alternate clock cycles, and (6) accumulate separately the sum of frequency A register 520 added to the IIR data and frequency B register 521 on alternate clock cycles.

Bit shifter 510 shifts the bits of the IIR data supplied from IIR filter 221 in one bit increments. The shifted IIR data is sign extended to match the data length of frequency A and frequency B registers 520 and 521.

Adder 515 adds the shifted IIR data to frequency A and transmits the sum to first multiplexer 525, overflow detector 560, and capture register 565. Overflow detector 560 detects an overflow resulting from the summation and issues an alarm if an overflow occurs. Capture register 565 stores the sum in real time.

First multiplexer 525 selects either frequency A, frequency B, or the sum of frequency A and the IIR data in response to a mode designation signal from mode decoder and controller 530, and supplies the selected data to adder 535. Adder 535 adds the output of either register A 541 or register B 542 selected using multiplexer 545 depending upon the selected mode. Normally, the contents of register A 541 are added to the selected output of multiplexer 525 by adder 535. However, in the dual modes (5) and (6) above, the contents of register B 542 are also used on alternating clock cycles to permit simultaneous accumulation of two phases at half the clock rate.

After summation by adder 535, the accumulated sum is stored in registers A and B (541,542) and subsequently stored in output register 550. Output register 550 transmits the accumulated sum to phase-to-amplitude converter 223.

Figure 6:
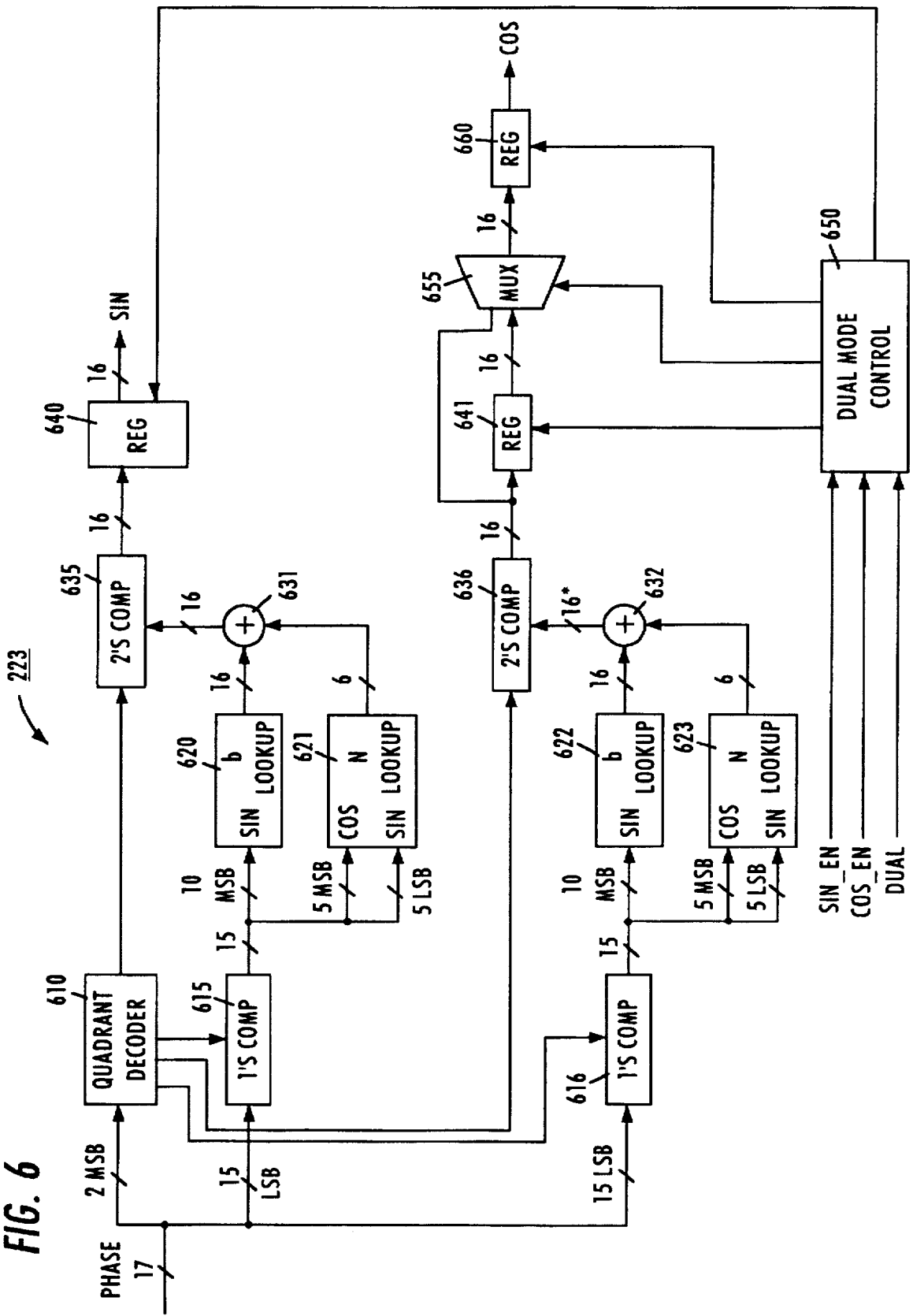
FIG. 6 is a schematic illustration of a phase-to-amplitude converter useful in the implementation of the present invention in the signal processing ASIC shown in FIG. 3.

FIG. 6 shows the details of a phase-to-amplitude converter 223 useful in the signal processing ASIC shown in FIG. 3. Phase-to-amplitude converter 223 includes a quadrant decoder 610, 1's complement converters 615 and 616, B lookup tables 620 and 622, N lookup tables 621 and 623, adders 631 and 632, 2's complement converters 635 and 636, output registers 641, 642, and 660, a dual mode controller 650, and a multiplexer 655.

Phase-to-amplitude converter 223 is in essence a lookup table. Simplify lookup tables 620–623 store only the first quadrant of the sine function. The other quadrants of the sine function are generated by reversing the direction of the readout from lookup tables 620–623, by inverting the polarity of the output of lookup tables 620–623, or both. Reversing the direction of the readout can be accomplished by addressing lookup tables 620–623 with the 1's complement of the least significant bits of the input phase ramp received from phase accumulator 222. The polarity inversion is accomplished by taking the 2's complement of the output of the lookup tables 620–623.

The two most significant bits of the input received from phase accumulator 222 are supplied to quadrant decoder 610. Quadrant decoder 610 looks at these two most significant bits and determines which quadrant they represent.

Quadrant decoder 610 then transmits separate instructions to 1's complement converters 615 and 616 to reverse the readout of lookup tables 620–623 depending upon the detected quadrant. Further, quadrant decoder 610 then transmits separate instructions to 2's complement converters 635 and 636 to perform polarity inversion by taking the two's complement of the outputs lookup tables 620–623 depending upon the detected quadrant. Table 1 shows an example of how quadrant decoder determines the quadrant from the two most significant bits of the input signal.

TABLE 1

| Quadrant | MSBs | Cosine Polarity | Sine Polarity | Cosine Direction | Sine Direction |
|---|---|---|---|---|---|
| 0 | 00 | + | + | reverse | forward |
| 1 | 01 | – | + | forward | reverse |
| 2 | 10 | – | – | reverse | forward |
| 3 | 11 | + | – | forward | reverse |

The remaining least significant bits of the input signal (phase ramp) are supplied to 1's complement converters 615 and 616. To reduce the size of the lookup tables, sine approximation may be used. Such sine approximation may be based on the following trigonometric decomposition function:

$$\sin\theta = \sin(\Phi_1 + \Phi_2) = \sin\Phi_1 \cos\Phi_2 + \sin\Phi_2 \cos\Phi_1$$

If $\Phi_2 << \Phi_1$, then $$\sin\theta = \sin\Phi_1 + \sin\Phi_2 \cos\hat{\Phi}_1.$$

B lookup tables 620 and 622 are used to look up the $\sin\Phi_1$ portions of the above equation and N lookup tables 621 and 623 are used to lookup the $\sin\Phi_2 \cos\hat{\Phi}_1$ portions. Adder 631 adds the outputs of B lookup table 620 and N lookup table 622 to provide the approximation $\sin\theta$. Similarly, adder 632 adds the outputs of B lookup table 621 and N lookup table 623 to provide the approximation $\sin\theta$, which is converted to $\cos\theta$ by appropriate inversion performed using 1's complement converter 616 under instruction of quadrant decoder 610.

1's complement converters 615 and 616 supply the ten most significant of the remaining bits, which represent $\Phi_1$, to B lookup tables 620 and 622 and supply the five most significant of the remaining bits (the five most significant bits of $\Phi_1$), which represent $\hat{\Phi}_1$, to a cosine input of N lookup tables 621 and 623 and the five least significant of the remaining bits, which represent $\Phi_2$, to the sine input of N lookup tables 621 and 623.

The output of 2's complement converter 635 is provided to output register 640 for subsequent transmission to Q noise shaper 225. The output of 2's complement converter 636 is provided to output register 641 and multiplexer 655. Output register 641 provides an output to multiplexer 655. Multiplexer 655 permits register 641 to be bypassed depending upon whether NCO 122 is operating in a dual mode. Multiplexer 655 provides an output to output register 660 for subsequent transmission to I signal noise shaper 224.

Dual mode controller 650 receives mode designation signals from mode decoder and controller 530 (FIG. 5) of phase accumulator 222 and controls phase-to-amplitude converter 223 to output a sine output, a cosine output, or to operate in a dual mode.

I signal noise shaper 224 and Q signal noise shaper 225 are provided to reduce amplitude quantization noise. To accomplish this task, I signal noise shaper 224 and Q signal noise shaper 225 preferably quantize the input data received from phase-to-amplitude converter 223, filter the differences between the quantized data and the input data, and subtract this filtered difference from the input data.

I signal noise shaper 224 provides an output signal, which is designated as NCO C in FIG. 3, to component router 132 for subsequent routing to component circuit 124, to the COS input of component circuit 125, and to component router 135 for subsequent routing to component circuit 127. Q signal noise shaper 225 provides an output signal, which is designated as NCO S in FIG. 3, to component router 134 for subsequent routing to component circuit 126, to the SIN input of component circuit 125, and to component router 136 for subsequent routing to component circuit 128.

Component circuits 127 and 128 comprise signal processing circuits for performing output signal processing on I and Q data respectively supplied thereto. Component circuits 127 and 128 each include subcomponent circuits (271–274, 281–284) comprising an output decimator (271,281), an output scaler (272,282), an output offsetter (273,283), and an output formatter (274,284). Each of the subcomponents are connected to control processor interface 140 via a control processor (CP) bus 141.

Output decimators 271 and 272 may be independently instructed to reduce the sample rates of the data signals supplied from component routers 135 and 136, respectively.

Output scalers 272 and 282 permit the data supplied from output decimators 271 and 281 to be scaled by a right or left shift. A right shift rounds up the data to be output and reduces truncation errors. The number of bits and the direction of shift may be independently programmed for each of output scalers 272 and 282. By selecting no shift, output scalers 272 and 282 may be effectively bypassed.

Output offsetters 273 and 283 permit the data supplied from output scalers 272 and 274 to be summed with an independently programmable DC offset. The offset may be selected to null out DC offsets from D/A converters. By selecting a zero offset, output offsetters 273 and 283 may be effectively bypassed.

Output formatters 274 and 284 receive processed data, which may have been processed in number of possible formats, such as two's complement, offset binary, sign magnitude, two's complement negative, etc., from output offsetters 273 and 274 and converts the processed data into a desired format for subsequent use. The output data format is independently programmable. By selecting an internal format that is the same as the format of the output signal, output formatters 274 and 284 may be effectively bypassed. Output formatter 274 provides the I output (I OUT) of the signal processing ASIC, while output formatter 284 provides the Q output (Q OUT).

Component routers 132–136 selectively couple together component circuits 121–128 to selectively route signals therethrough.

Component router 132 includes three multiplexers, each of which is connected to CP bus 141 and controlled by control processor interface 140. A first multiplexer 321 receives outputs I DATA, NCO C, and CM PI from input interpolator 154, I signal noise shaper 224, and complex multiplier 125, respectively, and supplies one of these outputs to second multiplexer 322 and third multiplexer 323. Second multiplexer 322 selects the output provided by first multiplexer 321 or the output from FIR filter 242, and provides the selected output to FIR input decimator/output interpolator 241. Third multiplexer 323 selects the output provided by first multiplexer 321 or the output from FIR input decimator/output interpolator 241, and provides the selected output to FIR filter 242.

Component router 133 includes two multiplexers, each of which is connected to CP bus 141 and controlled by control processor interface 140. A first multiplexer 331 receives outputs I DATA and I FD from input interpolator 154 and component router 135, respectively, and supplies a selected one of these outputs to the I input of complex multiplier 125. A second multiplexer 332 receives outputs I DATA, Q DATA, and I FD from input interpolator 154, input interpolator 158, and component router 135, respectively, and supplies a selected one of these outputs to the Q input of complex multiplier 125.

Component router 134 includes three multiplexers, each of which is connected to CP bus 141 and controlled by control processor interface 140. A first multiplexer 341 receives outputs Q DATA, NCO S, CM PQ, and I FD from input interpolator 158, Q signal noise shaper 225, complex multiplier 125, and component router 135, respectively, and supplies one of these outputs to second multiplexer 342 and third multiplexer 343. Second multiplexer 342 selects the output provided by first multiplexer 341, the output from FIR filter 262, or the output provided by FIR filter 242 and provides the selected output to FIR input decimator/output interpolator 261. Third multiplexer 343 selects the output provided by first multiplexer 341 or the output from FIR input decimator/output interpolator 261, and provides the selected output to FIR filter 262.

Component router 135 includes two multiplexers, each of which is connected to CP bus 141 and controlled by control processor interface 140. A first multiplexer 351 selects the output provided by FIR filter 242 or FIR input decimator/output interpolator 241 and provides the selected output, which is designated as I FD, to the input of a second multiplexer 352 of component router 135, first multiplexer 331 of component router 133, and first multiplexer 341 of component router 134. Second multiplexer 352 receives outputs I FD, NCO C, CM PI, CM PS, and Q SR from first multiplexer 351, I signal noise shaper 224, the PI and PS outputs of complex multiplier 125, and FIR filter 262, respectively, and selects one of these outputs to supply to output decimator 271.

Component router 136 includes two multiplexers, each of which is connected to CP bus 141 and controlled by control processor interface 140. A first multiplexer 361 selects the output provided by FIR filter 262 or FIR input decimator/output interpolator 261 and provides the selected output, which is designated as Q FD, to the input of a second multiplexer 362 of component router 136 and second multiplexer 332 of component router 133. Second multiplexer 362 receives outputs Q FD, NCO S, and CM PQ from first multiplexer 361, Q signal noise shaper 225, and the PQ output of complex multiplier 125, respectively, and selects one of these outputs to supply to output decimator 281.

Control processor interface 140 receives control signals from an external source and controls component routers 132–136 such that selected component circuits 121–128 are coupled together in a manner by which the predetermined component functions of selected component circuits 121–128 are performed on input signals in an order necessary to accomplish a selected programmable function for the signal processing ASIC.

On the foundation of the basic structure of the signal processing ASIC shown in FIG. 3, some of the basic programmable functions the signal processing ASIC may perform will now be described. In particular, the signal processing ASIC operates in one of the following modes to perform the corresponding function:

(1) Dual baseband filtering mode;
(2) Cascaded baseband filtering mode;
(3) Baseband filtering and quadrature modulation;
(4) Baseband quadrature demodulation and baseband filtering mode;
(5) IF quadrature demodulation and baseband filtering mode;
(6) Stand-alone quadrature numerically-controlled oscillator mode;
(7) Dual numerically-controlled oscillator mode;
(8) Cascadable FIR filter mode; and
(9) Baseband filtering and baseband modulation mode.

(1) Dual baseband filtering mode

In the Dual baseband filtering mode, I and Q input data is passed through input processors 121 and 122 to component routers 132 and 134, respectively. Component routers 132 and 134 route the data to FIR filters 242 and 262 when no input decimation is desired, and route the data through FIR input decimators/output interpolators 241 and 261 when input decimation is desired. When the data is first sent to FIR input decimators/output interpolators 241 and 261, component routers 132 and 134 subsequently route the outputs of FIR input decimators/output interpolators 241 and 261 to FIR filters 242 and 262.

Component routers 135 and 136 route the outputs of FIR filters 242 and 262 to component router 133 when output interpolation is not desired. When output interpolation is desired, component routers 132 and 134 route the output of FIR filters 242 and 262 through FIR input decimators/output interpolators 241 and 261, and then the outputs of FIR input decimators/output interpolators 241 and 261 are then routed to component router 133.

Component router 133 routes these outputs to the I and Q inputs of complex multiplier 125. Complex multiplier 125 multiplies the I and Q data with phase offset coefficients stored in registers 431–434. Component routers 135 and 136 then route the PI and PQ outputs of complex multiplier 125 to output processors 127 and 128.

(2) Cascaded baseband filtering mode

In the cascaded baseband filtering mode, only the I data input is used. Data from this input passes through input processor 121 and is provided to component router 132. Component router 132 routes the data to FIR filter 242 when no input decimation is desired, and routes the data through FIR input decimator/output interpolator 241 when input decimation is desired. When the data is first sent to FIR input decimator/output interpolator 241, component router 132 subsequently routes the output of FIR input decimator/output interpolator 241 to FIR filter 242. The output of FIR filter 242 is provided to component router 134, which routes the output to FIR filter 262. Component router 134 routes the output of FIR filter 262 to component router 136 when no output interpolation is desired, and routes the output through FIR input decimator/output interpolator 261 when output interpolation is desired. Whenever the output of FIR filter 262 is first sent to FIR input decimator/output interpolator 261, component router 134 subsequently routes the output of FIR input decimator/output interpolator 261 to FIR filter 262. The output of FIR filter 262 is provided to component router 136, which routes the output to output processor 128.

(3) Baseband filtering and quadrature modulation

In the baseband filtering and quadrature modulation mode, the signal processing ASIC operates in much the same manner as in the dual baseband filtering mode described above, with the following exceptions.

In this mode, NCO 122 is utilized to provide inputs directly to the SIN and COS inputs of complex multiplier 125. The PS output of complex multiplier 125 is routed through output processor 127 to the I output by component router 135. The resulting output is a digital representation of a quadrature modulated carrier.

(4) Baseband quadrature demodulation and baseband filtering mode

In the baseband quadrature demodulation and baseband filtering mode, I and Q input data is passed through input processors 121 and 122 to component routers 133, which passes the I and Q data to the respective I and Q inputs of complex multiplier 124. Complex multiplier 125 multiplies the I and Q data with SIN and COS data supplied to the SIN and COS inputs of complex multiplier 125 by NCO 122. Component routers 132 and 134 then route the PI and PQ outputs of complex multiplier 125 to FIR filters 242 and 262 when no input decimation is desired, and route the PI and PQ outputs through FIR input decimators/output interpolators 241 and 261 when input decimation is desired. When the PI and PQ outputs are first sent to FIR input decimators/output interpolators 241 and 261, component routers 132 and 134 subsequently route the outputs of FIR input decimators/output interpolators 241 and 261 to FIR filters 242 and 262.

Component routers 135 and 136 route the outputs of FIR filters 242 and 262 to component routers 135 and 136 when output interpolation is not desired. When output interpolation is desired, component routers 132 and 134 route the output of FIR filters 242 and 262 through FIR input decimators/output interpolators 241 and 261, and then the outputs of FIR input decimators/output interpolators 241 and 261 are then routed to component routers 135 and 136, which route the outputs to output processors 127 and 128.

In this mode, for example, the complex multiplier an NCO are used as a phase rotator in a carrier recovery loop.

(5) IF quadrature demodulation and baseband filtering mode

In the IF quadrature demodulation and baseband filtering mode, the signal processing ASIC operates in much the same manner as in the baseband quadrature demodulation and baseband filtering mode described above, with the exception that only the I input port is used. Thus, in this mode, the I DATA from input processor 121 is supplied to both the I and Q input terminals of complex multiplier 125.

In this mode, the I DATA represents sampled IF data and NCO 122 is used as both a downconverter to baseband and a phase rotator. Phase accumulator 222 may offset the output of IIR filter 221 by a fixed frequency (A or B) in this mode, with the fixed frequency representing the carrier frequency.

(6) Stand-alone guadrature numerically-controlled oscillator mode

In the stand-alone quadrature numerically-controlled oscillator mode, the COS and SIN outputs of NCO 122 are passed to output processors 127 and 128, respectively, by component routers 135 and 136. In this mode, noise shaping may be independently enabled or disabled and the frequency may be programmed to frequency A or B.

(7) Dual numerically-controlled oscillator mode

In the dual numerically-controlled oscillator mode, the component routers route the output of NCO 122 in the same manner as in the stand-alone quadrature mode. In this mode, however, NCO operates in a dual mode and the cosine of the frequency programmed into frequency A register 520 emerges from the I output port while the sine of the frequency programmed into frequency B register 521 emerges from the Q output port. Further, frequency A added to the output of IIR filter 221 can also be programmed to emerge from the I output port. In this mode, noise shaping by signal noise shapers 224 and 225 may be independently enabled or disabled and a finite state machine (not shown) may be used to control the component routers.

(8) Cascadable FIR filter mode

In the cascadable filter mode, the component routers route the data in much the same manner as in the cascade baseband filtering mode. Only in this mode, I and Q shift registers (not shown) in FIR filters 242 and 262 effectively form one double-length shift register. In this configuration, a partial sum input is added to the output of FIR filter 242; and the output of FIR filter 242 is added to the output of FIR filter 262. In this manner, multiple chips may be cascaded to implement long FIR filters. To implement this configuration, FIR filters 242 and 262 each have shift register inputs and outputs and partial sum inputs and outputs. The shift register input of the first stage is connected to the data source via I input port and the partial sum input of the first stage is connected to ground via Q input port. The shift register output of the first stage is connected to the shift register input of the next stage and the partial sum output of the first stage is connected to the partial sum input of the next stage. By connecting the I and Q output ports of the signal processing ASIC operating in this mode to the I and Q input ports of another signal processing ASIC operating in this same mode, additional FIR filters may be cascaded.

(9) Baseband filtering and baseband modulation mode

In the baseband filtering and baseband modulation mode, the signal processing ASIC operates in much the same manner as in the baseband filtering and quadrature modulation mode described above, with the following exceptions.

In this mode, complex multiplier 125 multiplies the outputs of output interpolators 241 and 261 with the outputs of NCO 122 and outputs are provided from the PI and PQ outputs of complex multiplier 125 via the I and Q.

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An application-specific integrated circuit for performing a selected one of a plurality of programmable functions on an input signal, wherein at least one of said programmable functions is non-identical to the others, said circuit comprising:

a plurality of component circuits, wherein at least one of said component circuits is non-identical to the others, each for performing a predetermined component function on a signal supplied thereto;

said plurality of component circuits comprise a combination of the following components: dual FIR filters; decimation/interpolation FIR filters; a complex multiplier; a numerically-controlled oscillator; input and output scalers and offsetters; input and output formatters; an input interpolator; an output decimator;

a plurality of component routers for selectively coupling together said plurality of component circuits; and a control processor interface for receiving control signals that control said plurality of component routers such that selected component circuits are coupled together in a manner by which predetermined component functions of the selected component circuits are performed on the input signal in an order necessary to accomplish the selected one of the plurality of programmable functions.

2. The application-specific integrated circuit of claim 1, wherein said plurality of programmable functions comprise any combination of the following functions: dual baseband filtering; cascaded baseband filtering; baseband filtering and quadrature modulation; baseband quadrature demodulation and baseband filtering; IF quadrature demodulation and baseband filtering; stand-alone quadrature numerically-controlled oscillation; dual numerically-controlled oscillation; cascadable FIR filtering; and baseband filtering and baseband modulation.

3. The application-specific integrated circuit of claim 1, wherein said plurality of programmable functions comprise the following functions: dual baseband filtering; and baseband filtering and quadrature modulation.

4. The application-specific integrated circuit of claim 1, wherein said plurality of programmable functions comprise the following functions: baseband filtering and quadrature modulation; and baseband quadrature demodulation and baseband filtering.

5. The application-specific integrated circuit of claim 1, wherein said plurality of programmable functions comprise the following functions: baseband quadrature demodulation and baseband filtering; and IF quadrature demodulation and baseband filtering.

6. The application-specific integrated circuit of claim 1, wherein said plurality of programmable functions comprise the following functions: baseband filtering and quadrature modulation; and baseband filtering and baseband modulation.

7. The application-specific integrated circuit of claim 1, wherein said plurality of programmable functions comprise the following functions: dual baseband filtering; stand-alone quadrature numerically-controlled oscillation; and dual numerically-controlled oscillation.

8. The application-specific integrated circuit of claim 1, wherein said plurality of programmable functions comprise the following functions: dual baseband filtering; cascaded baseband filtering; baseband filtering and quadrature modulation; baseband quadrature demodulation and baseband filtering; IF quadrature demodulation and baseband filtering; stand-alone quadrature numerically-controlled oscillation; dual numerically-controlled oscillation; cascadable FIR filtering; and baseband filtering and baseband modulation.

9. The application-specific integrated circuit of claim 1, wherein said plurality of component routers comprise programmable data and clock routing multiplexers connected to inputs and outputs of said plurality of component circuits.

10. The application-specific integrated circuit of claim 1, further comprising a substrate on which said plurality of component circuits, said plurality of component routers, and said control processor interface are positioned.

11. A method for configuring an application-specific integrated circuit to perform a selected one of a plurality of programmable functions on an input signal, wherein at least one of said programmable functions is non-identical to the others, wherein the circuit comprises a plurality of component circuits, wherein at least one of said component circuits is non-identical to the others, each for performing a predetermined component function on a signal supplied thereto, the method comprising the steps of:

providing a plurality of component circuits comprising a combination of the following components: dual FIR filters; decimation/interpolation FIR filters; a complex multiplier; a numerically-controlled oscillator; input and output scalers and offsetters; input and output formatters; an input interpolator; an output decimator;

providing a plurality of component routers for selectively coupling together said plurality of component circuits; and controlling said plurality of component routers to couple together selected component circuits such that predetermined component functions of the selected component circuits are performed on the input signal in an order necessary to accomplish the selected one of the plurality of programmable functions.

12. The method of claim 11, wherein said plurality of programmable functions comprise any combination of the following functions: dual baseband filtering; cascaded baseband filtering; baseband filtering and quadrature modulation; baseband quadrature demodulation and baseband filtering; IF quadrature demodulation and baseband filtering; stand-alone quadrature numerically-controlled oscillation; dual numerically-controlled oscillation; cascadable FIR filtering; and baseband filtering and baseband modulation.

13. The method of claim 11, wherein said plurality of programmable functions comprise the following functions: dual baseband filtering; and baseband filtering and quadrature modulation.

14. The method of claim 11, wherein said plurality of programmable functions comprise the following functions: baseband filtering and quadrature modulation; and baseband quadrature demodulation and baseband filtering.

15. The method of claim 11, wherein said plurality of programmable functions comprise the following functions: baseband quadrature demodulation and baseband filtering; and IF quadrature demodulation and baseband filtering.

16. The method of claim 11, wherein said plurality of programmable functions comprise the following functions: baseband filtering and quadrature modulation; and baseband filtering and baseband modulation.

17. The method of claim 11, wherein said plurality of programmable functions comprise the following functions: dual baseband filtering; stand-alone quadrature numerically-controlled oscillation; and dual numerically-controlled oscillation.

18. The method of claim 11, wherein said plurality of programmable functions comprise the following functions: dual baseband filtering; cascaded baseband filtering; baseband filtering and quadrature modulation; baseband quadrature demodulation and baseband filtering; IF quadrature demodulation and baseband filtering; stand-alone quadrature numerically-controlled oscillation; dual numerically-controlled oscillation; cascadable FIR filtering; and baseband filtering and baseband modulation.

* * * * *

UNITED STATES PATENT AND TRADEMARK OFFICE
CERTIFICATE OF CORRECTION

PATENT NO. : 5,793,656

DATED : August 11, 1998

INVENTOR(S) : Robert Richmond, et al.

It is certified that error appears in the above-identified patent and that said Letters Patent is hereby corrected as shown below:

On the title page, item [54] and Column 1:
 In the Title:

Change "Programming" to --Programmable--.

Signed and Sealed this

Second Day of February, 1999

Attest:

Attesting Officer

*Acting Commissioner of Patents and Trademarks*